United States Patent
Shen et al.

(10) Patent No.: US 9,763,108 B2
(45) Date of Patent: Sep. 12, 2017

(54) REMOTE ELECTRICAL TILT ANTENNA, BASE STATION, AND METHOD FOR MATCHING RCU WITH RF PORT

(71) Applicant: Huawei Technologies Co., Ltd., Shenzhen (CN)

(72) Inventors: Jian Shen, Shenzhen (CN); Weihong Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/343,737

(22) Filed: Nov. 4, 2016

(65) Prior Publication Data

US 2017/0078892 A1   Mar. 16, 2017

Related U.S. Application Data

(63) Continuation of application No. PCT/CN2014/076795, filed on May 5, 2014.

(51) Int. Cl.
*H04M 1/00* (2006.01)
*H04W 16/26* (2009.01)
(Continued)

(52) U.S. Cl.
CPC .......... *H04W 16/26* (2013.01); *H04W 24/02* (2013.01); *H04W 24/10* (2013.01); *H01Q 3/005* (2013.01); *H04W 16/28* (2013.01)

(58) Field of Classification Search
CPC ..... H04W 16/26; H04W 16/28; H04W 24/10; H04W 24/02; H01Q 3/005
(Continued)

(56) References Cited

U.S. PATENT DOCUMENTS

| 4,183,044 A * | 1/1980 | Breithaupt | H04N 9/475 |
| | | | 348/211.9 |
| 6,346,924 B1 * | 2/2002 | Heinz | H01Q 1/125 |
| | | | 343/757 |

(Continued)

FOREIGN PATENT DOCUMENTS

EP   2425794 A1   3/2012

OTHER PUBLICATIONS

Foreign Communication From A Counterpart Application, European Application No. 14891468.2, Extended European Search Report dated Apr. 18, 2017, 7 pages.

*Primary Examiner* — Dominic Rego
(74) *Attorney, Agent, or Firm* — Conley Rose, P.C.

(57) ABSTRACT

A remote electrical tilt antenna with a mismatching device built in and a method for matching a remote control unit (RCU) with a radio frequency (RF) port can accurately and efficiently determine a matching relationship between an RCU and an RF port. The remote electrical tilt antenna includes an RCU configured to receive a drive instruction, and configured to drive the gear; the gear, where the gear is connected to a phase shifter, the gear is driven by the RCU, and the gear, driven by the RCU, is configured to drive the phase shifter; and the phase shifter, where the phase shifter is configured to adjust a direction of an antenna beam, and a mismatching device is built in the phase shifter, where the mismatching device is associated with an RF channel, and the mismatching device is configured to enable the RF channel to generate impedance mismatch.

7 Claims, 5 Drawing Sheets

(51) Int. Cl.
*H04W 24/10* (2009.01)
*H04W 24/02* (2009.01)
*H04W 16/28* (2009.01)
*H01Q 3/00* (2006.01)

(58) Field of Classification Search
USPC ........ 455/19, 25, 63.4, 82, 83, 562.1, 575.5,
455/575.7, 121, 129, 193.1; 343/824,
343/724, 726, 729, 751, 835, 844, 853,
343/855, 879, 893; 342/403, 406, 423,
342/430, 434, 437, 445, 446, 447
See application file for complete search history.

(56) References Cited

U.S. PATENT DOCUMENTS

| | | | |
|---|---|---|---|
| 8,027,703 B2 | 9/2011 | Girard et al. | |
| 2003/0052832 A1* | 3/2003 | Alexopoulos | H03H 7/40 343/860 |
| 2004/0137869 A1* | 7/2004 | Kim | H04B 1/30 455/324 |
| 2005/0014475 A1* | 1/2005 | Kim | H03C 3/406 455/115.1 |
| 2007/0102592 A1* | 5/2007 | Ashton | B61L 5/1872 246/473 R |
| 2009/0149123 A1* | 6/2009 | Blagg | F24F 11/053 454/258 |
| 2009/0278761 A1* | 11/2009 | Makinen | H01P 1/184 343/904 |
| 2010/0201590 A1* | 8/2010 | Girard | H01Q 1/246 343/766 |
| 2010/0214190 A1* | 8/2010 | Shin | H01Q 19/021 343/834 |
| 2011/0134005 A1* | 6/2011 | Oh | H01Q 3/02 343/766 |
| 2013/0200257 A1* | 8/2013 | Chapon | H01J 49/36 250/282 |
| 2013/0229308 A1* | 9/2013 | Pu | H01Q 3/40 342/373 |
| 2014/0103184 A1* | 4/2014 | Asrokin | H01Q 1/1228 248/514 |
| 2014/0139372 A1* | 5/2014 | Seol | H01Q 3/2605 342/367 |
| 2014/0370884 A1* | 12/2014 | Kummetz | H04W 24/10 455/423 |
| 2015/0163684 A1* | 6/2015 | Unno | H04W 24/04 455/418 |
| 2015/0168974 A1* | 6/2015 | Mascarenhas | H04L 12/10 700/297 |

* cited by examiner

REMOTE ELECTRICAL TILT ANTENNA, BASE STATION, AND METHOD FOR MATCHING RCU WITH RF PORT

CROSS-REFERENCE TO RELATED APPLICATION

This application is a continuation of International Application No. PCT/CN2014/076795, filed on May 5, 2014, the disclosure of which is hereby incorporated by reference in its entirety.

TECHNICAL FIELD

Embodiments of the present application relate to the communications field, and in particular, to a remote electrical tilt antenna, a base station, and a method for matching a remote control unit (RCU) with a radio frequency (RF) port.

BACKGROUND

Figure 1:
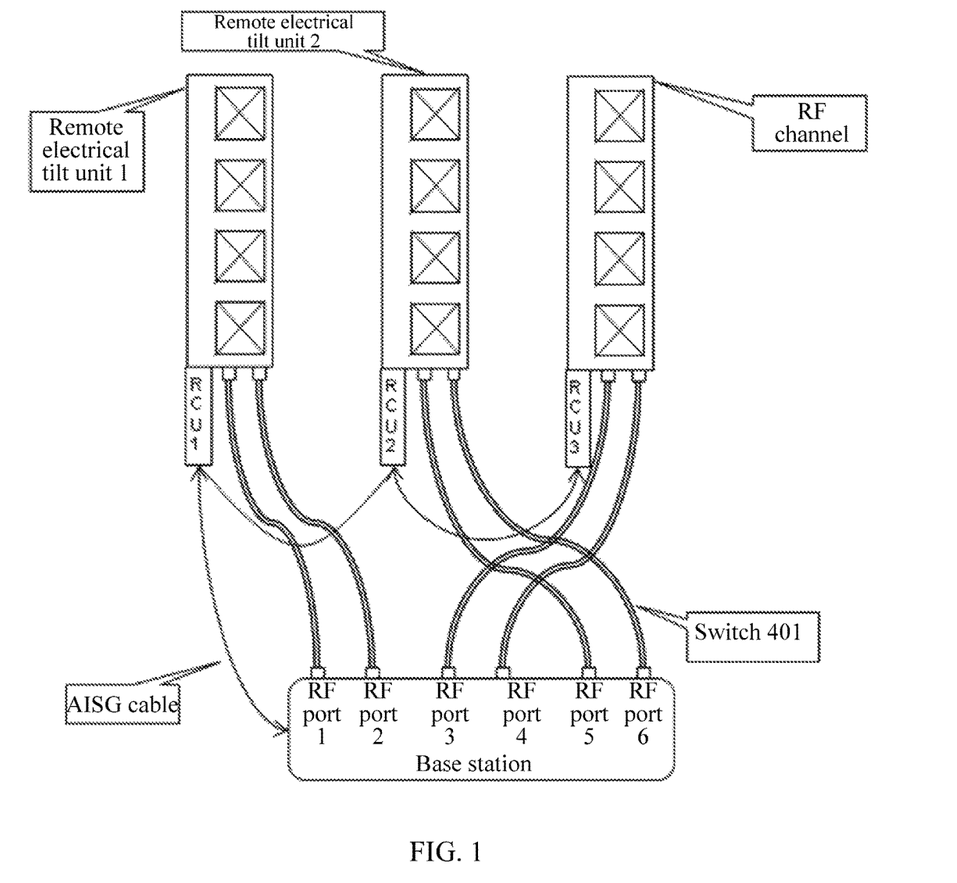
FIG. 1 is a schematic diagram of a remote electrical tilt antenna according to an embodiment of the present application.

In optimization of a wireless network that uses a remote electrical tilt antenna, downtilts of antennas in some sectors are generally adjusted to improve sector coverage and enhance network performance. A base station manages a remote electrical tilt antenna using an Antenna Interface Standards Group (AISG) interface. Generally, a base station manages RCUs of multiple remote electrical tilt antennas in a cascading manner. As shown in FIG. 1, the base station in FIG. 1 is a multi-transmit multi-receive base station. There are three groups of RF units with different frequency bands and standards. Each group of unit has two RF ports, and the three groups of RF units are respectively connected to three remote electrical tilt units. RCUs of the remote electrical tilt units are connected in a cascading manner and are managed in a unified manner. In such a scenario, when an operation and maintenance center adjusts a downtilt of an antenna, multiple RCU objects, such as RCU1, RCU2, and RCU3, are displayed at the base station side. If an antenna downtilt corresponding to RF port 3 and RF port 4 of the base station needs to be adjusted, it is necessary to first check records left during project installation of the base station. The records include a correspondence between an RCU identification number and an antenna, and a correspondence between a base station port and an antenna port.

Information about these correspondences is recorded by project construction personnel during installation of the base station and the antenna. Because the information is recorded manually, a probability of making an error is high. If an antenna to which RF port 3 and RF port 4 are connected is mistakenly recorded as remote electrical tilt unit 2, it causes maintenance personnel to mistakenly adjust RCU2, which leads to a change of a coverage area corresponding to RF port 5 and RF port 6, whereas a coverage area, which actually needs to be adjusted, of RF port 3 and RF port 4 remains unchanged. Once such an error occurs, the error can be identified only in a drive test or a user's complaint. If an installation relationship between an RCU and an antenna is wrong in the records, a same result is caused.

In a traditional remote electrical tilt antenna, because there is no communication interface between a remote electrical tilt system of a remote electrical tilt antenna and an antenna, the remote electrical tilt system cannot notify a base station of whether an antenna currently being adjusted is an antenna that a user wants to adjust. In order to resolve a problem caused by this defect, a solution of copying a remote electrical tilt (RET) serial number is proposed.

According to the solution, construction personnel copy RET serial numbers, record relationships between the RET serial numbers and information such as RF ports, frequency bands, antenna positions, and array positions, and then configure, in a maintenance center, relationships between sector objects and RET objects according to recorded information. Although the solution of manually copying the RET serial numbers can establish the relationships between sector objects and RET objects, the solution, however, also has many problems. For example, it is likely to make a mistake in copying and typing in a serial number, it is likely to lose a data sheet, and work of data summarization and serial number information maintenance is complicated.

SUMMARY

Embodiments of the present application provide a remote electrical tilt antenna, a base station, and a method for matching an RCU with an RF port, which can accurately and efficiently determine a matching relationship between an RCU and an RF port.

According to a first aspect, a remote electrical tilt antenna is provided, which includes at least one remote electrical tilt unit, where the at least one remote electrical tilt unit includes an RCU, where the RCU is connected to a gear and is configured to receive a drive instruction, where the drive instruction is used to instruct the RCU to perform driving, and the RCU is further configured to drive the gear; the gear, where the gear is connected to a phase shifter, the gear is driven by the RCU, and the gear, driven by the RCU, is configured to drive the phase shifter; and the phase shifter, where the phase shifter is configured to adjust a direction of an antenna beam, and a mismatching device is built in the phase shifter, where the mismatching device is associated with a radio frequency RF channel, and the mismatching device is configured to enable the RF channel to generate impedance mismatch.

In a first possible implementation manner, the phase shifter further includes a moving slider, where at least one trigger apparatus is disposed on the moving slider, the trigger apparatus moves along with the moving slider, and the trigger apparatus is configured to trigger the mismatching device to enable the RF channel to generate impedance mismatch.

With reference to the first possible implementation manner of the first aspect, in a second possible implementation manner, the at least one trigger apparatus is a metal spring plate, where the metal spring plate is disposed at an end of the moving slider, and when the moving slider is at a maximum stroke position, the metal spring plate comes into contact with the mismatching device.

With reference to the first possible implementation manner of the first aspect, in a third possible implementation manner, the at least one trigger apparatus is a copper foil, where the copper foil is disposed at an end of the moving slider, and when the moving slider is at a maximum stroke position, the copper foil comes into contact with the mismatching device.

With reference to the first aspect or any one of the three possible implementation manners of the first aspect, in a fourth possible implementation manner, the drive instruction is a first mismatch message or a second mismatch message; when the drive instruction is the first mismatch message, the drive instruction is used to instruct the RCU to perform first driving; and when the drive instruction is the second mismatch message, the drive instruction is used to instruct the RCU to perform second driving.

According to a second aspect, a remote electrical tilt antenna is provided, which includes at least one remote electrical tilt unit, where the at least one remote electrical tilt unit includes an RCU, where the RCU is connected to a gear and is configured to receive a drive instruction, where the drive instruction is used to instruct the RCU to perform driving, and the RCU is further configured to drive the gear; the gear, where the gear is connected to a phase shifter, the gear is driven by the RCU, the gear, driven by the RCU, is configured to drive the phase shifter, and the gear is further configured to trigger a mismatching device; the phase shifter, where the phase shifter is configured to adjust a direction of an antenna beam; and the mismatching device, where the mismatching device is connected to an RF channel, and the mismatching device is configured to enable the RF channel to generate impedance mismatch.

According to a third aspect, a base station is provide, where the base station is connected to at least one RCU using an AISG cable, the base station is connected to at least one remote electrical tilt antenna through at least one RF port using an RF cable, and the base station includes a sending module, where the sending module is configured to send first mismatch instruction information to an RCU, and the first mismatch instruction information is used to instruct the at least one RCU to perform first driving, so that a standing wave exception appears on the at least one RF port; a receiving module, where the receiving module is configured to receive first-driving completion information, and the first-driving completion information is sent by the RCU after the first driving is complete; a scanning module, where the scanning module is configured to, after the receiving module receives the first-driving completion information, determine the at least one RF port on which the standing wave exception appears; a processing module, where the processing module is configured to match the at least one RCU with the at least one port on which the standing wave exception appears; and a storage module, where the storage module is configured to store a result of the matching completed by the processing module.

In a first possible implementation manner, the processing module is further configured to mark a matching relationship between the at least one RF port on which the standing wave exception appears under the first driving and the RCU as a main matching relationship.

With reference to the third aspect or the first possible implementation manner of the third aspect, in a second possible implementation manner, the sending module is further configured to send second mismatch instruction information to the RCU, where the second mismatch instruction information is used to instruct the at least one RCU to perform second driving, so that a standing wave exception appears on the at least one RF port; the receiving module is further configured to receive second-driving completion information, where the second-driving completion information is sent by the RCU after the second driving is complete; and the processing module is further configured to mark a matching relationship between the at least one RF port on which the standing wave exception appears under the second driving and the RCU as a diversity matching relationship.

According to a fourth aspect, a method for matching an RCU with an RF port is provided, and a base station performs the following matching steps: sending, by the base station, first mismatch instruction information to the RCU, where the first mismatch instruction information is used to instruct the at least one RCU to perform first driving, so that a standing wave exception appears on the RF port; receiving, by the base station, first-driving completion information, where the first-driving completion information is sent by the RCU after the first driving is complete; scanning, by the base station, the RF port to determine the RF port on which the standing wave exception appears; and matching, by the base station, the RCU with the RF port on which the standing wave exception appears.

In a first possible implementation manner, the matching includes marking, by the base station, a matching relationship between the at least one RF port on which the standing wave exception appears under the first driving and the RCU as a main matching relationship With reference to the first possible implementation manner of the fourth aspect, in a second possible implementation manner, the matching steps further include sending, by the base station after the matching is complete, second mismatch instruction information to the RCU, where the second mismatch instruction information is used to instruct the at least one RCU to perform second driving, so that a standing wave exception appears on the RF port; receiving, by the base station, second-driving completion information, where the second-driving completion information is sent by the RCU after the second driving is complete; scanning, by the base station, the RF port to determine the RF port on which the standing wave exception appears; and marking, by the base station, a matching relationship between the RF port on which the standing wave exception appears under the second driving and the RCU as a diversity matching relationship.

With reference to the fourth aspect or the first or the second possible implementation manner of the fourth aspect, in a third possible implementation manner, after the base station completes the matching, the base station selects another RCU and performs the matching steps again.

According to a fifth aspect, a method for matching an RCU with an RF port is provided, where the RCU receives first mismatch instruction information sent by a base station, and according to the first mismatch instruction message, the RCU triggers a mismatching device using a power apparatus; and the mismatching device generates impedance mismatch, so that a standing wave exception appears on the RF port, and the base station matches the RCU with the RF port on which the standing wave exception appears.

In a first possible implementation manner, the triggering, by the RCU, a mismatching device using a power apparatus includes driving, by the RCU, a phase shifter using a gear, so that a moving slider in the phase shifter triggers the mismatching device.

In a second possible implementation manner, the triggering, by the RCU, a mismatching device using a power apparatus includes driving a gear by the RCU, so that the gear triggers the mismatching device.

According to a method and a device in the embodiments of the present application, an RCU drives a gear to drive a phase shifter; the driven phase shifter triggers a mismatching device, which causes a standing wave exception on an RF channel, so that a base station finds, by means of scanning, an RF port on which the standing wave exception appears, and the base station determines a corresponding matching relationship between the RCU and the RF port on which the standing wave exception is caused by driving of the RCU. A remote electrical tilt antenna with the structure can efficiently and accurately obtain a matching relationship between the RCU and the RF port using the base station, without affecting performance of the antenna. Moreover, the mismatching device is triggered using an inherent phase shifter in the antenna, and no other power apparatus needs to be added, which saves costs.

BRIEF DESCRIPTION OF THE DRAWINGS

To describe the technical solutions in the embodiments of the present application more clearly, the following briefly introduces the accompanying drawings required for describing the embodiments of the present application. The accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. The described embodiments are merely a part rather than all of the embodiments of the present application. All other embodiments obtained by a person of ordinary skill in the art based on the embodiments of the present application without creative efforts shall fall within the protection scope of the present application.

In the embodiments of the present application, a base station may be a base transceiver station (BTS) in a Global System for Mobile Communications (GSM) or Code Division Multiple Access (CDMA) system, may also be a NodeB (NB) in a Wideband Code Division Multiple Access (WCDMA) system, and may also be an evolved NodeB (Evolutional NodeB, ENB, or eNodeB) in a Long Term Evolution (LTE) system, which is not limited in the present application.

FIG. 1 shows a remote electrical tilt antenna of a multi-band and multi-standard base station. The base station manages the remote electrical tilt antenna using an AISG interface, and the base station manages RCUs, which are connected in a cascading manner, of multiple remote electrical tilt antennas.

The base station is a multi-transmit multi-receive base station and has three groups of RF units with different frequency bands and standards, and each group of unit has two RF ports. There are six RF ports in total, which are RF port 1, RF port 2, RF port 3, RF port 4, RF port 5, and RF port 6 respectively. Each group of RF port is respectively connected to three remote electrical tilt units, where the three remote electrical tilt units are remote electrical tilt unit 1, remote electrical tilt unit 2, and remote electrical tilt unit 3, and each remote electrical tilt unit corresponds to RCU1, RCU2, and RCU3. RCU1, RCU2, and RCU3 are connected in a cascading manner and managed in a unified manner.

When an operation and maintenance center adjusts a downtilt of an antenna, multiple RCU objects, that is, RCU1, RCU2, and RCU3, are displayed on a maintenance terminal of the base station.

Figure 2:
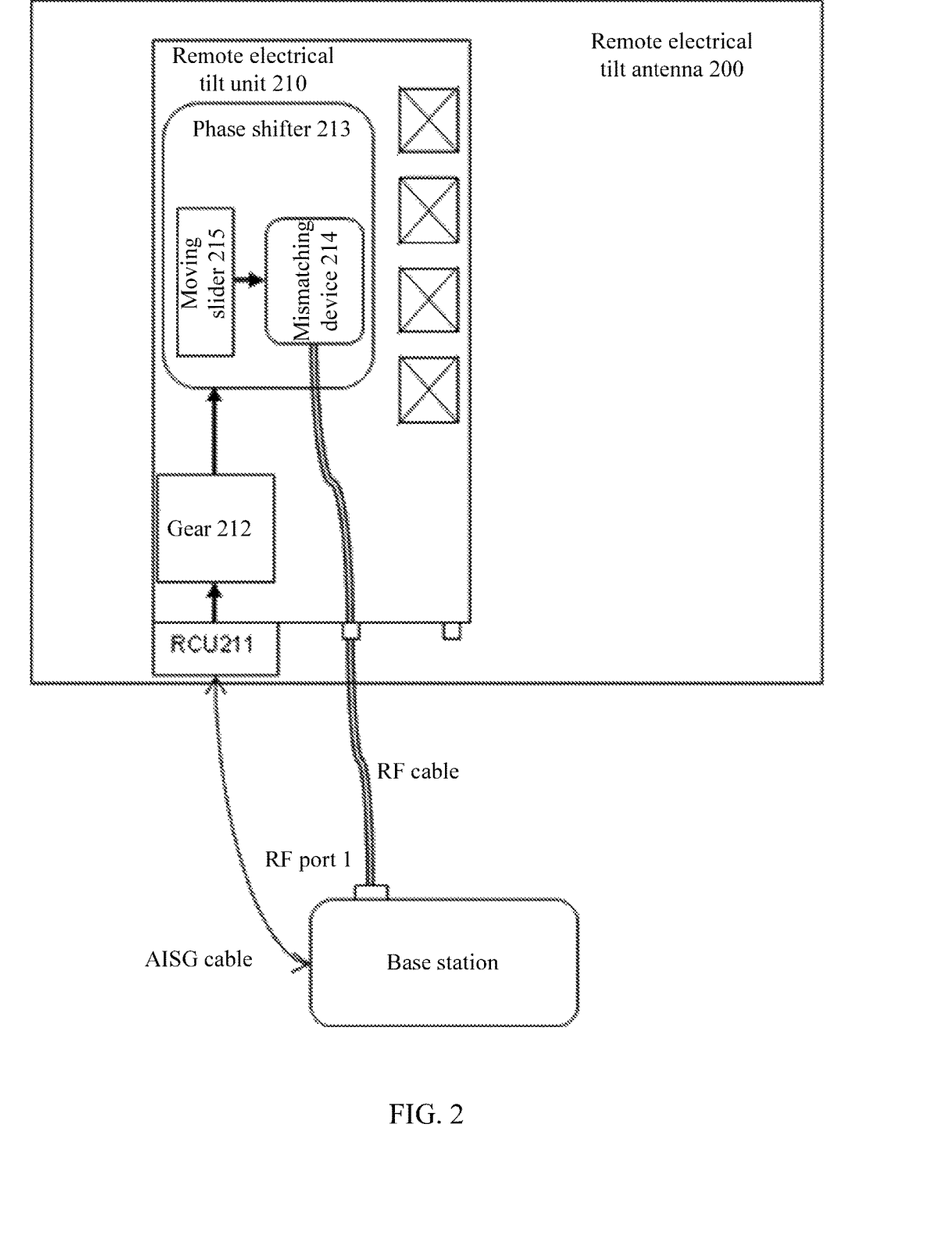
FIG. 2 is a schematic diagram of a remote electrical tilt antenna according to another embodiment of the present application.

FIG. 2 shows a schematic structural diagram of a remote electrical tilt antenna 200 according to the present application. The remote electrical tilt antenna 200 shown in FIG. 2 may be based on the remote electrical tilt antenna of the base station shown in FIG. 1. As shown in FIG. 2, the remote electrical tilt antenna 200 includes at least one remote electrical tilt unit 210, where the remote electrical tilt unit 210 includes an RCU211, a gear 212, a phase shifter 213, and a mismatching device 214 built in the phase shifter.

For the RCU211, the RCU211 is connected to the gear 212 and is configured to receive a drive instruction, where the drive instruction is used to instruct the RCU211 to perform driving, and the RCU211 is further configured to drive the gear 212; for the gear 212, the gear 212 is connected to the phase shifter 213, the gear 212 is driven by the RCU211, and the gear 212, driven by the RCU211, is configured to drive the phase shifter 213; and for the phase shifter 213, the phase shifter 213 is configured to adjust a direction of an antenna beam, and the mismatching device 214 is built in the phase shifter 213, where the mismatching device 214 is associated with an RF channel, and the mismatching device 214 is configured to enable the RF channel to generate impedance mismatch.

As shown in FIG. 2, the remote electrical tilt antenna includes the at least one remote electrical tilt unit, and each remote electrical tilt unit is connected to the base station. The base station is connected to the RCU211 of the each remote electrical tilt unit using an AISG cable in a cascading manner, and manages the each remote electrical tilt unit. The base station is connected to the each remote electrical tilt unit through an RF port using an RF cable.

The remote electrical tilt unit RCU211 receives a drive instruction from the base station using the AISG cable, where the drive instruction may be a first mismatch message, and may also be a second mismatch message. The RCU211 is configured to perform first driving after receiving the first mismatch message. RCU211 driving is directly applied to the gear 212. The gear 212 is connected to the phase shifter 213, and the gear 212, driven by the RCU211, is configured to drive the phase shifter 213.

The mismatching device 214 is built in the phase shifter 213, and the mismatching device 214 is associated with the RF channel, where the RF channel is a radio frequency transmission path from an RF port of the base station to an antenna element. The RF cable is one of transmission carriers of the transmission path. The transmission carriers of the transmission path may further include a printed circuit board (PCB) or another component in the phase shifter 213.

The mismatching device 214 is an apparatus that can cause impedance mismatch between a signal source and a load in a radio frequency circuit, and a structure of the mismatching device 214 may differ according to a mismatch form.

Figure 3:
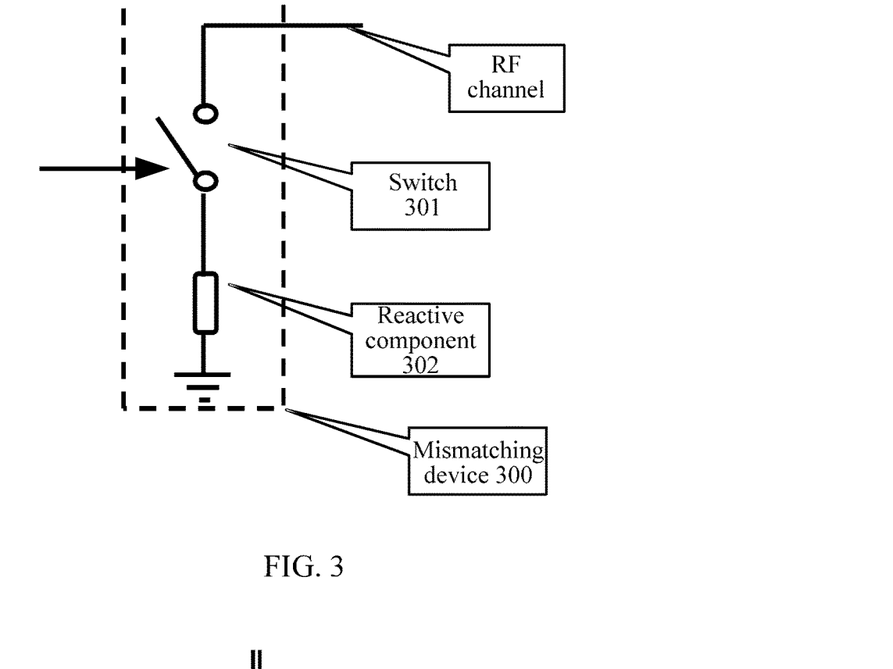
FIG. 3 is a schematic diagram of a mismatching device according to an embodiment of the present application.
Figure 4:
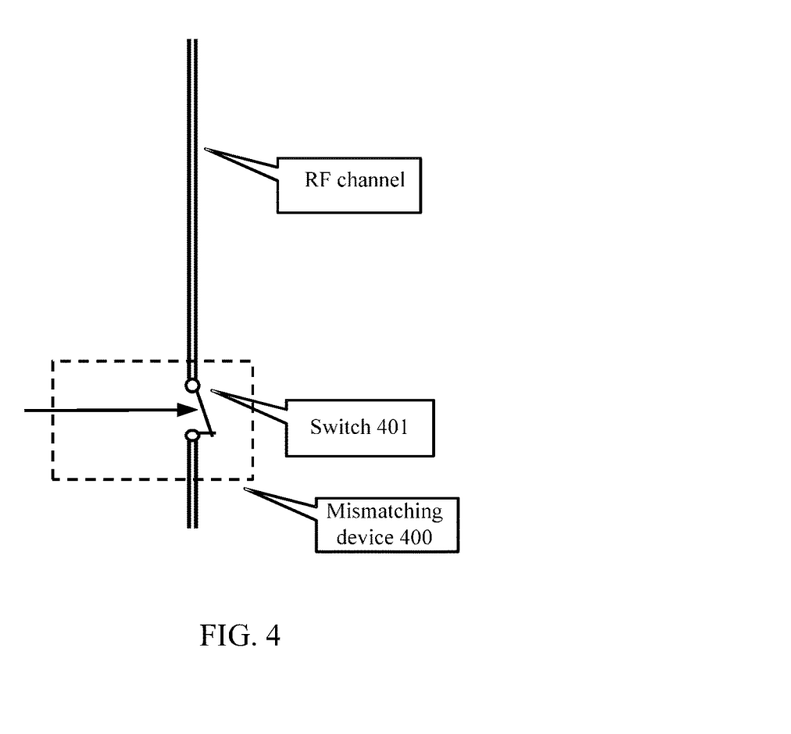
FIG. 4 is a schematic diagram of a mismatching device according to another embodiment of the present application.

FIG. 3 and FIG. 4 show two different mismatching device structures. A mismatching device 300 shown in FIG. 3 includes a switch 301 and a reactive component 302, where the reactive component may be a resistor, an inductor, or a capacitor, and the reactive component is grounded. The mismatching device 300 is connected to an RF channel. When the switch is triggered, the mismatching device 300 causes mismatch of the RF channel, and the mismatch of the RF channel causes a standing wave exception on an RF port.

A mismatching device 400 shown in FIG. 4 includes a switch 401, where the switch is disposed on an RF channel. When the switch is triggered, the mismatching device 400 causes mismatch of the RF channel, and the mismatch of the RF channel causes a standing wave exception on an RF port.

As shown in FIG. 2, the phase shifter 213 further includes a moving slider 215, where at least one trigger apparatus is disposed on the moving slider, the trigger apparatus moves along with the moving slider, and the trigger apparatus is configured to trigger the mismatching device 214, so that the RF channel generates impedance mismatch.

A position of the mismatching device 214 in the remote electrical tilt unit needs to meet a condition that when the moving slider moves to a position, the trigger apparatus disposed on the moving slider can trigger the mismatching device 214.

In this embodiment of the present application, an RCU drives a gear to drive a phase shifter; the driven phase shifter triggers a mismatching device, which causes a standing wave exception on an RF channel, so that a base station finds, by means of scanning, an RF port on which the standing wave exception appears, and the base station determines a corresponding matching relationship between the RCU and the RF port on which the standing wave exception is caused by driving of the RCU. A remote electrical tilt antenna with the structure can efficiently and accurately obtain a matching relationship between the RCU and the RF port using the base station, without affecting performance of the antenna. Moreover, the mismatching device is triggered using an inherent phase shifter in the antenna, and no other power apparatus needs to be added, which saves costs.

The phase shifter includes a moving slider 215, where the moving slider 215 is driven to slide. The moving slider 215 slides to different positions, so that the phase shifter can adjust a beam direction. In this embodiment, at least one trigger apparatus is disposed at an end the moving slider, where the trigger apparatus moves along with the moving slider 215, and the trigger apparatus is configured to trigger the mismatching device 214, so that the RF channel generates impedance mismatch, thereby generating a standing wave exception. When the moving slider 215 moves to a maximum stroke position, the trigger apparatus triggers the mismatching device.

Further, the trigger apparatus may be a metal spring plate. When the metal spring plate comes into contact with the mismatching device, the mismatching device 214 is switched on, so that the mismatching device 214 is triggered, which causes the RF channel to generate impedance mismatch, so that a standing wave exception appears on the RF port.

The trigger apparatus may be a copper foil. When the copper foil comes into contact with the mismatching device 214, the mismatching device is switched on, so that the mismatching device 214 is triggered, which causes the RF channel to generate impedance mismatch, so that a standing wave exception appears on the RF port.

The trigger apparatus is disposed at the end of the moving slider 215, which does not affect the adjustment of the beam direction performed by the phase shifter; and a drive apparatus is disposed on an existing moving slider in the phase shifter, which effectively saves costs.

The trigger apparatus may also be disposed at another position of the moving slider 215, for example, in the middle of the moving slider 215, as long as the trigger apparatus, driven by the moving slider, can come into contact with and trigger the mismatching device.

With reference to FIG. 1, it may be understood that the remote electrical tilt antenna 200 may further include multiple remote electrical tilt units that are the same as the remote electrical tilt unit 210.

Figure 5:
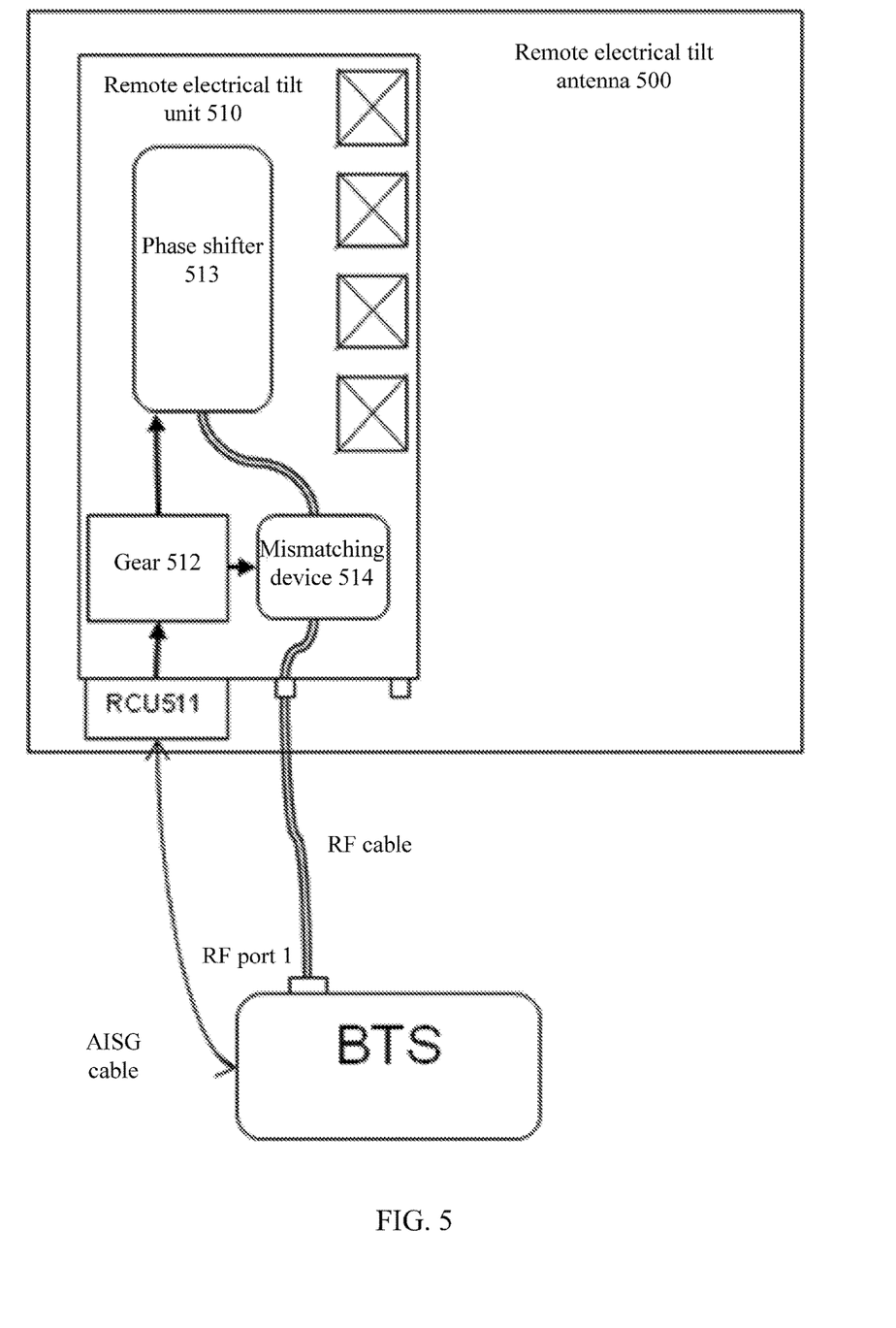
FIG. 5 is a schematic block diagram of a remote electrical tilt antenna according to another embodiment of the present application.

FIG. 5 shows a remote electrical tilt antenna 500 in an embodiment of the present application. The remote electrical tilt antenna 500 includes at least one remote electrical tilt unit 510, where the at least one remote electrical tilt unit 510 includes an RCU511, where the RCU511 is connected to a gear 512 and is configured to receive a drive instruction, where the drive instruction is used to instruct the RCU511 to perform driving, and the RCU511 is further configured to drive the gear 512; the gear 512, where the gear 512 is connected to a phase shifter 513, the gear 512 is driven by the RCU511, the gear 512, driven by the RCU511, is configured to drive the phase shifter 513, and the gear 512 is further configured to trigger a mismatching device 514; the phase shifter 513, where the phase shifter 513 is configured to adjust a direction of an antenna beam; and the mismatching device 514, where the mismatching device 514 is connected to an RF channel, and the mismatching device 514 is configured to enable the RF channel to generate impedance mismatch.

In this embodiment of the present application, the RCU511 drives the gear 512 to drive the phase shifter 513; the driven phase shifter 513 triggers the mismatching device 514, which causes a standing wave exception on an RF channel, so that a base station finds, by means of scanning, an RF port on which the standing wave exception appears, and the base station determines a corresponding matching relationship between the RCU511 and the RF port on which the standing wave exception is caused by driving of the RCU511. A remote electrical tilt antenna with the structure can efficiently and accurately obtain a matching relationship between the RCU511 and the RF port using the base station, without affecting performance of the antenna. Moreover, the mismatching device 514 is triggered using the inherent phase shifter 513 in the antenna, and no other power apparatus needs to be added, which saves costs.

Further, in a dual-polarized antenna, two remote electrical tilt units share a set of RCU and gear, and phase shifters in the two remote electrical tilt units sharing the RCU and the gear are respectively called a main phase shifter and a diversity phase shifter. In a dual-polarized antenna scenario, trigger apparatuses are respectively disposed at different ends of moving sliders in the main phase shifter and the diversity phase shifter. For example, one trigger apparatus is disposed at a lower end of the moving slider in the main phase shifter, and the other trigger apparatus is disposed at an upper end of the moving slider in the diversity phase shifter. When the RCU performs driving, the main phase shifter and the diversity phase shifter simultaneously perform adjustment in a same direction, that is, the moving sliders simultaneously slide toward a same direction. When the RCU performs first driving, the moving sliders simultaneously slide to the top, and when they slide to a maximum stroke position, the trigger apparatus at the lower end of the moving slider in the main phase shifter triggers a mismatching device, which causes a standing wave exception on an RF port; however, the trigger apparatus on the moving slider in the diversity phase shifter does not trigger the mismatching device. When the RCU performs second driving, the moving sliders simultaneously slide to the bottom, and when they slide to a maximum stroke position, the trigger apparatus at the upper end of the moving slider in the diversity phase shifter triggers the mismatching device, which causes a standing wave exception on the RF port; however, the trigger apparatus on the moving slider in the main phase shifter does not trigger the mismatching device.

In a dual-polarized antenna, because trigger apparatuses are disposed at different positions of moving sliders in phase shifters sharing an RCU and a gear, the RCU only needs to perform driving in two different directions, so that port relationships corresponding to two different remote electrical tilt units may be obtained, and matching relationships between different RF ports and RCUs may be efficiently obtained.

Figure 6:
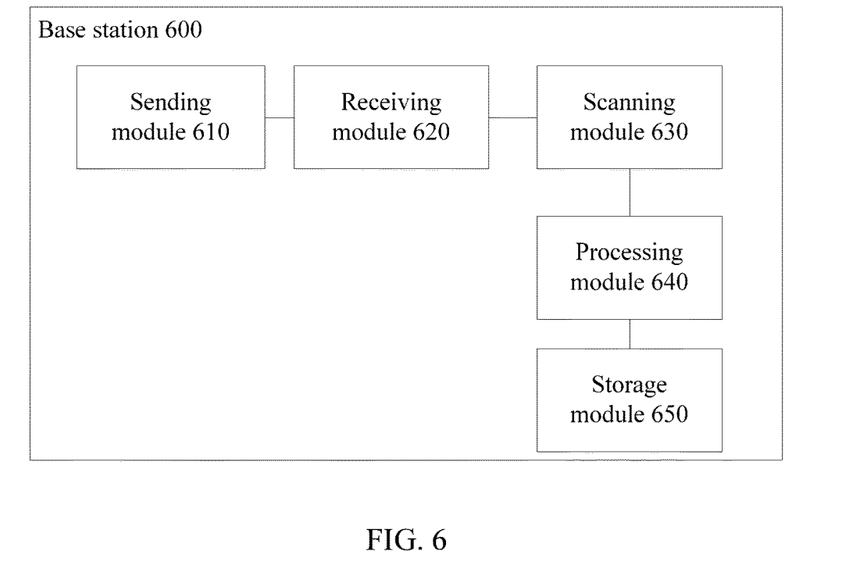
FIG. 6 is a schematic block diagram of a base station according to an embodiment of the present application.

FIG. 6 shows a base station 600 in an embodiment of the present application, where the base station 600 is connected to at least one RCU using an AISG cable, and the base station 600 is connected to at least one remote electrical tilt antenna through at least one RF port using an RF cable. The base station 600 includes a sending module 610, where the sending module 610 is configured to send first mismatch instruction information to an RCU, and the first mismatch instruction information is used to instruct the at least one RCU to perform first driving, so that a standing wave exception appears on the at least one RF port; a receiving module 620, where the receiving module 620 is configured to receive first-driving completion information, and the first-driving completion information is sent by the RCU after the first driving is complete; a scanning module 630, where the scanning module 630 is configured to, after the receiving module 620 receives the first-driving completion information, determine the at least one RF port on which the standing wave exception appears; a processing module 640, where the processing module 640 is configured to match the at least one RCU with the at least one port on which the standing wave exception appears; and a storage module 650, where the storage module 650 is configured to store a result of the matching completed by the processing module 640.

In this embodiment, the base station sends a first mismatch message using the sending module 610, instructs an RCU to perform driving on a remote electrical tilt unit corresponding to the RCU, and finds, by means of scanning, a port on which a standing wave exception appears, so that a matching relationship between the RCU and the RF port may be obtained. The base station may efficiently and accurately obtain the matching relationship between the RCU and the RF port using the remote electrical tilt unit having a mismatch function, which greatly increases accuracy of a correspondence and improves efficiency.

The processing module 640 is further configured to mark a matching relationship between the at least one RF port on which the standing wave exception appears under the first driving and the RCU as a main matching relationship.

The sending module 610 is further configured to send second mismatch instruction information to the RCU, where the second mismatch instruction information is used to instruct the at least one RCU to perform second driving, so that a standing wave exception appears on the at least one RF port; the receiving module 620 is further configured to receive second-driving completion information, where the second-driving completion information is sent by the RCU after the second driving is complete; and the processing module 640 is further configured to mark a matching relationship between the at least one RF port on which the standing wave exception appears under the second driving and the RCU as a diversity matching relationship.

In this embodiment, the base station sends a first mismatch message using the sending module 610, instructs the RCU to perform driving on a remote electrical tilt unit corresponding to the RCU, and finds, by means of scanning, a port on which a standing wave exception appears, so that a matching relationship between the RCU and the RF port may be obtained. The base station may efficiently and accurately obtain the matching relationship between the RCU and the RF port using the remote electrical tilt unit having a mismatch function, which greatly increases accuracy of a correspondence and improves efficiency.

Figure 7:
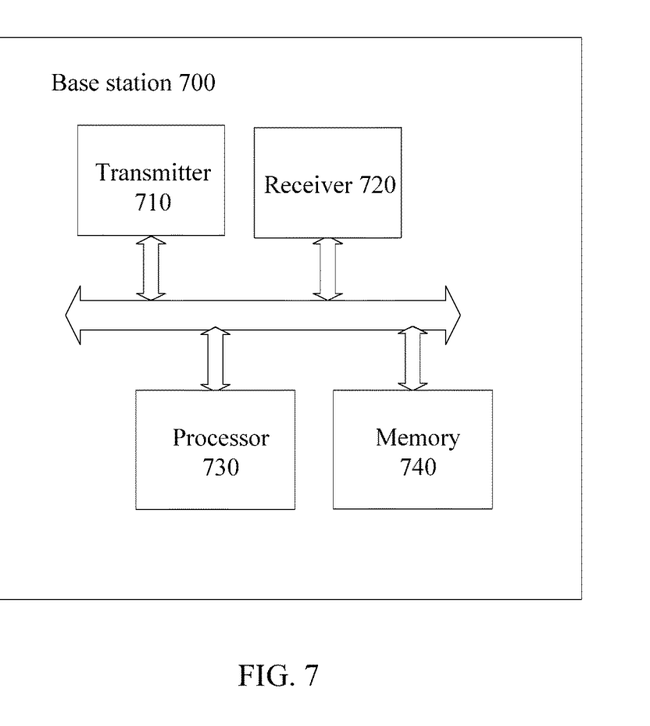
FIG. 7 is a schematic block diagram of a base station according to another embodiment of the present application.

FIG. 7 shows a base station 700 in an embodiment of the present application, where the base station is connected to at least one RCU using an AISG cable, and the base station is connected to at least one remote electrical tilt antenna through at least one RF port using an RF cable. The base station includes a transmitter 710, where the transmitter 710 is configured to send first mismatch instruction information to an RCU, and the first mismatch instruction information is used to instruct the at least one RCU to perform first driving, so that a standing wave exception appears on the at least one RF port; a receiver 720, where the transmitter 710 is configured to receive first-driving completion information, and the first-driving completion information is sent by the RCU after the first driving is complete; a processor 730, where the processor 730 is configured to, after the transmitter 710 receives the first-driving completion information, determine the at least one RF port on which the standing wave exception appears, where the processor 730 is further configured to match the at least one RCU with the at least one port on which the standing wave exception appears; and a memory 740, where the memory 740 is configured to store a result of the matching completed by the processor 730.

In this embodiment, the base station sends a first mismatch message using the transmitter 710, instructs an RCU to perform driving on a remote electrical tilt unit corresponding to the RCU, and finds, by means of scanning, a port on which a standing wave exception appears, so that a matching relationship between the RCU and the RF port may be obtained. The base station may efficiently and accurately obtain the matching relationship between the RCU and the RF port using a remote electrical tilt unit having a mismatch function, which greatly increases accuracy of a correspondence and improves efficiency.

The processor 730 is further configured to mark a matching relationship between the at least one RF port on which the standing wave exception appears under the first driving and the RCU as a main matching relationship.

The transmitter 710 is further configured to send second mismatch instruction information to the RCU, where the second mismatch instruction information is used to instruct the at least one RCU to perform second driving, so that a standing wave exception appears on the at least one RF port; the transmitter 710 is further configured to receive second-driving completion information, where the second-driving completion information is sent by the RCU after the second driving is complete; and the processor 730 is further configured to mark a matching relationship between the at least one RF port on which the standing wave exception appears under the second driving and the RCU as a diversity matching relationship.

In this embodiment, the base station sends a first mismatch message using the transmitter 710, instructs an RCU to perform driving on a remote electrical tilt unit corresponding to the RCU, and finds, by means of scanning, a port on which a standing wave exception appears, so that a matching relationship between the RCU and the RF port may be obtained. The base station may efficiently and accurately obtain the matching relationship between the RCU and the RF port using a remote electrical tilt unit having a mismatch function, which greatly increases accuracy of a correspondence and improves efficiency.

An embodiment of the present application further discloses a method for matching an RCU with an RF port. The method may be based on the remote electrical tilt antenna, the apparatus, or the base station disclosed in embodiments shown in FIG. 1 to FIG. 7.

The base station sends a first mismatch message to an RCU through an AISG interface, where the first mismatch instruction information is used to instruct the at least one RCU to perform first driving, so that a standing wave exception appears on the RF port. After receiving the first mismatch message, the RCU performs the first driving on a phase shifter connected to the RCU.

Optionally, the first driving can enable a moving slider in the phase shifter to move to a position. The position may be a maximum stroke position of the moving slider. After completing the first driving, the RCU sends first-driving completion information to the base station. A trigger apparatus is disposed at an end of the moving slider. When the moving slider moves to the maximum stroke position, the trigger apparatus disposed at the end of the moving slider triggers a mismatching device, and the mismatching device generates impedance mismatch, so that a standing wave exception appears on the RF port, and the base station matches the RCU with the RF port on which the standing wave exception appears.

Optionally, the first driving is driving performed by an RCU on a phase shifter using a gear. A trigger apparatus may be disposed on the gear. When the gear moves and triggers a mismatching device, the mismatching device generates impedance mismatch, so that a standing wave exception appears on the RF port, and the base station matches the RCU with the RF port on which the standing wave exception appears.

After the base station receives the first-driving completion information, the base station scans an RF port to determine the RF port on which the standing wave exception appears. The base station may scan and detect all RF ports, and the base station may enable a standing wave detection function that the base station has. The base station uses low-power scanning and detects reflected signals at the same time. If the base station detects a standing wave exception on a corresponding RF port, it may be determined that the RF port on which the standing wave exception appears corresponds to and matches with an RCU that performs the first driving. On the contrary, it indicates that there is no correspondence between the RF port of the base station and the RCU.

The base station may send a reset message to the RCU to instruct the RCU to move to an initial position.

The base station may send a first mismatch message to another RCU, and perform matching steps on an RF port corresponding to the another RCU.

Further, in a dual-polarized antenna scenario, the base station marks a matching relationship between the at least one RF port on which the standing wave exception appears under the first driving and the RCU as a main matching relationship. After the matching is complete, the base station sends second mismatch instruction information to the RCU, where the second mismatch instruction information is used to instruct the at least one RCU to perform second driving, so that a standing wave exception appears on the RF port.

After receiving the second mismatch message, the RCU performs second driving. The second driving is driving whose direction is different from a direction of the first driving. For a process of performing, by the RCU, the second driving so that the standing wave exception appears on the RF port, reference may be made to a step of performing the first driving by the RCU, and a difference lies in that the trigger apparatus is located at a different position of a moving slider. For example, when the RCU performs first driving, moving sliders simultaneously slide to the top, and when they slide to a maximum stroke position, a trigger apparatus at a lower end of a moving slider in a main phase shifter triggers a mismatching device, which causes a standing wave exception on an RF port; however, a trigger apparatus on a moving slider in a diversity phase shifter does not trigger the mismatching device. When the RCU performs second driving, the moving sliders simultaneously slide to the bottom, and when they slide to a maximum stroke position, a trigger apparatus at an upper end of a moving slider in a diversity phase shifter triggers the mismatching device, which causes a standing wave exception on the RF port; however, the trigger apparatus on the moving slider in the main phase shifter does not trigger the mismatching device.

After completing the second driving, the RCU sends a second-driving completion information to the base station. After the base station receives the second-driving completion information, the base station scans an RF port to determine the RF port on which the standing wave exception appears. The base station may scan and detect all RF ports, and the base station may enable a standing wave detection function that the base station has. The base station uses low-power scanning and detects reflected signals at the same time. If the base station detects a standing wave exception on a corresponding RF port, it may be determined that the RF port on which the standing wave exception appears corresponds to and matches with an RCU that performs the second driving. On the contrary, it indicates that there is no correspondence between the RF port of the base station and the RCU.

The base station marks a matching relationship between the RF port on which the standing wave exception appears under the second driving and the RCU as a diversity matching relationship.

The base station may send a reset message to the RCU to instruct the RCU to move to an initial position;

The base station may send a first mismatch message to another RCU, and perform matching steps on an RF port corresponding to the another RCU.

The gear, the phase shifter, and the moving slider inside the phase shifter may be called a power apparatus, and the power apparatus may also be another apparatus that can trigger a mismatching device.

In this embodiment of the present application, an RCU drives a gear to drive a phase shifter; the driven phase shifter triggers a mismatching device, which causes a standing wave exception on an RF channel, so that a base station finds, by means of scanning, an RF port on which the standing wave exception appears, and the base station determines a corresponding matching relationship between the RCU and the RF port on which the standing wave exception is caused by driving of the RCU. A remote electrical tilt antenna with the structure can efficiently and accurately obtain a matching relationship between the RCU and the RF port using the base station, without affecting performance of the antenna. Moreover, the mismatching device is triggered using an inherent phase shifter in the antenna, and no other power apparatus needs to be added, which saves costs.

By cooperating with a base station, a remote electrical tilt antenna with a mismatching device built in and disclosed in this embodiment of the present application may further be configured to implement detection of a path loss from an output end of the base station to the antenna, and is configured to detect a delay from the output end of the base station to the antenna.

The base station may detect output power of the base station itself and reflected power of an antenna. After a mismatching device is triggered, total reflection of RF signals is formed. Transmit signals output by the base station are completely reflected to an output port of the base station. Power of reflected signals reflected to the output port of the base station is equal to a value obtained by subtracting twice a path loss from the output power of the base station. Therefore, it may be accurately obtained that the path loss is a value obtained by dividing a result of subtracting the power of the reflected signals from the output power of the base station by 2.

For a base station having a phase detect frequency domain reflectometry (PDFDR) function, swept-frequency signals may be input to an antenna port using a frequency domain reflectometry (FDR) technology, and fast Fourier transformation is performed on reflected signals to acquire time domain reflected signals. In a case in which a transmission speed and a loss of an antenna cable are known, a relationship curve of a reflection distance and a reflection voltage may be obtained, and a transmission delay from an RF output end of the base station to a short-circuit or open-circuit point may be calculated.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

It should be noted that, sequences of the embodiments are used only for convenience of description, but not used as a basis for quality comparison among the embodiments.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

Based on the foregoing descriptions of the embodiments, a person skilled in the art may clearly understand that the present application may be implemented by software in addition to a necessary universal hardware platform or by hardware only. In most circumstances, the former is a preferred implementation manner. Based on such an understanding, the technical solutions of the present application essentially, or the part contributing to the prior art may be implemented in a form of a software product. The software product is stored in a storage medium, and includes several instructions for instructing a computer device (which may be a personal computer, a server, or a network device) to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

In the several embodiments provided in the present application, it should be understood that the disclosed device and method may be implemented in other manners without departing from the scope of the present application. For example, the described apparatus embodiment is merely exemplary. For example, the component or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. A part or all of the components may be selected according to actual needs to achieve the objectives of the solutions of the embodiments. A person of ordinary skill in the art may understand and implement the embodiments of the present application without creative efforts.

In addition, the described devices, methods, and schematic diagrams of different embodiments may be combined with or integrated with other systems, components, technologies, or methods without departing from the scope of the present application. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A remote electrical tilt antenna, comprising:
   at least one remote electrical tilt unit,
   wherein the at least one remote electrical tilt unit comprises:
      a remote control unit (RCU);
      a gear; and
      a phase shifter,
      wherein the RCU is connected to the gear and is configured to receive a drive instruction,
      wherein the drive instruction is used to instruct the RCU to perform driving,
      wherein the RCU is further configured to drive the gear,
      wherein the gear is connected to the phase shifter,
      wherein the gear is driven by the RCU,
      wherein the gear, driven by the RCU, is configured to drive the phase shifter,
      wherein the phase shifter is configured to adjust a direction of an antenna beam,
      wherein a mismatching device is built in the phase shifter,
      wherein the mismatching device is associated with a radio frequency (RF) channel, and
      wherein the mismatching device is configured to enable the RF channel to generate impedance mismatch.

2. The remote electrical tilt antenna according to claim 1, wherein the phase shifter further comprises a moving slider, wherein at least one trigger apparatus is disposed on the moving slider, wherein the at least one trigger apparatus moves along with the moving slider, and wherein the at least one trigger apparatus is configured to trigger the mismatching device to enable the RF channel to generate impedance mismatch.

3. The remote electrical tilt antenna according to claim 2, wherein the at least one trigger apparatus is a metal spring plate, wherein the metal spring plate is disposed at an end of the moving slider, and wherein the metal spring plate comes into contact with the mismatching device when the moving slider is at a maximum stroke position.

4. The remote electrical tilt antenna according to claim 2, wherein the at least one trigger apparatus is a copper foil, wherein the copper foil is disposed at an end of the moving slider, and wherein the copper foil comes into contact with the mismatching device when the moving slider is at a maximum stroke position.

5. The remote electrical tilt antenna according to claim 1, wherein the drive instruction is a first mismatch message, and wherein the drive instruction is used to instruct the RCU to perform first driving when the drive instruction is the first mismatch message.

6. The remote electrical tilt antenna according to claim 1, wherein the drive instruction is a second mismatch message, and wherein the drive instruction is used to instruct the RCU to perform second driving when the drive instruction is the second mismatch message.

7. A remote electrical tilt antenna, comprising:
at least one remote electrical tilt unit,
wherein the at least one remote electrical tilt unit comprises:
  a remote control unit (RCU);
  a gear;
  a phase shifter; and
  a mismatching device,
  wherein the RCU is connected to the gear and is configured to receive a drive instruction,
  wherein the drive instruction is used to instruct the RCU to perform driving,
  wherein the RCU is further configured to drive the gear,
  wherein the gear is connected to the phase shifter,
  wherein the gear is driven by the RCU,
  wherein the gear, driven by the RCU, is configured to drive the phase shifter,
  wherein the gear is further configured to trigger a mismatching device,
  wherein the phase shifter is configured to adjust a direction of an antenna beam,
  wherein the mismatching device is connected to a radio frequency (RF) channel, and
  wherein the mismatching device is configured to enable the RF channel to generate impedance mismatch.

* * * * *